United States Patent [19]

Ross et al.

[11] Patent Number: 5,761,238
[45] Date of Patent: Jun. 2, 1998

[54] TRANSMITTED REFERENCE SPREAD SPECTRUM COMMUNICATIONS SYSTEM

[75] Inventors: John Anderson Fergus Ross; Irfan Ali, both of Schenectady; John Erik Hershey, Ballston Lake; Stephen Michael Hladik, Albany; Gary Jude Saulnier, Rexford; Michael Paul Weir, Ballston Lake, all of N.Y.

[73] Assignee: General Electric Company, Schenectady, N.Y.

[21] Appl. No.: 676,013

[22] Filed: Jul. 5, 1996

[51] Int. Cl.$^6$ ............................................. H04B 1/69
[52] U.S. Cl. ............................... 375/200; 375/206
[58] Field of Search ............................ 375/200, 204, 375/206, 208

[56] References Cited

U.S. PATENT DOCUMENTS

| | | | |
|---|---|---|---|
| 4,361,890 | 11/1982 | Green, Jr. et al. | 375/200 |
| 4,559,633 | 12/1985 | Kan et al. | 375/206 X |
| 5,099,495 | 3/1992 | Mikoshiba et al. | 375/208 X |
| 5,136,614 | 8/1992 | Kiramatsu et al. | 375/200 |
| 5,459,758 | 10/1995 | Moore, III | 375/200 |
| 5,519,692 | 5/1996 | Hershey et al. | 370/210 |
| 5,519,725 | 5/1996 | Hershey et al. | 375/216 |
| 5,671,247 | 9/1997 | Souissi et al. | 375/200 |

OTHER PUBLICATIONS

"Geometric Harmonic Modulation–A New Spread Spectrum Genre", John Hershey, Gary Saulnier, Amer Hassan and Stephen Hladik. International Conference on Communications, 1995.

*Primary Examiner*—Young T. Tse
*Attorney, Agent, or Firm*—Marvin Snyder

[57] ABSTRACT

A low complexity and low cost transmitted reference spread spectrum communications system provides several methods of generating a suitable wideband carrier, a method for combining the wideband carrier with a narrowband modulated wideband carrier, and a number of implementations of a simple, inexpensive receiver for the transmitted reference communications system. The transmitter includes a balanced modulator for modulating a wideband spreading signal with a narrowband message signal to generate a wideband carrier. A signal combiner combines the wideband carrier with a narrowband modulated wideband carrier to generate a transmitted reference spread spectrum signal. The receiver includes a selectable time delay device having a plurality of taps for receiving a detected received signal from the transmitter. A tap selector selects a delayed signal from the selectable time delay device. A mixer combines output signals of the selectable time delay device and the tap selector, and a leaky integrator receives the mixer output signal and controls the tap selector. The leaky detector generates the narrowband message signal.

11 Claims, 2 Drawing Sheets

TRANSMITTED REFERENCE SPREAD SPECTRUM COMMUNICATIONS SYSTEM

BACKGROUND OF THE INVENTION

1. Field of the Invention

This invention generally relates to spread spectrum communications systems and, more particularly, to a transmitted reference spread spectrum communications system employing a receiver of low complexity.

2. Description of the Related Art

Spread spectrum communications offer several advantages in communications applications requiring high reliability. These include low density power spectra and interference rejection. In the case of interference rejection, the interference may be accidental, that is, simply part of the environment of the communication system. In a specific application, the communications environment may include many potential reflectors giving rise to severe multipath interference. Such multipath interference typically insinuates deep nulls in the form of frequency selective fading. Spread spectrum communication is an ideal countermeasure to this difficulty.

There are several types of spread spectrum communication systems including direct sequence digital systems, frequency hopping systems, time hopping systems, pulse frequency modulated (or chirp) systems, and various hybrids. Of these, the direct sequence digital systems and frequency hopping systems are perhaps the more widely implemented. In a direct sequence digital system, a pseudorandom code generator is used to modulate the phase of a carrier. In a frequency hopping system, a coherent local oscillator is made to jump from one frequency to another.

Direct sequence spread spectrum modulation involves a wideband signal modulated by a narrowband message signal. A conventional implementation is to generate a wideband signal by use of a high speed shift register of n-stages with modulo-two feedback according to a primitive polynomial. The high speed digital sequence is then provided to a balanced modulator whose other input signal is a narrowband carrier. The wideband signal input to the balanced modulator is sometimes referred to as a "wideband carrier".

Spread spectrum communications are often asymmetric in cost and complexity. For example, the generation of suitable spread spectrum signals may be done with circuitry of relatively low complexity. The challenge is then to demodulate such signals. Usually it is necessary to construct a demodulator which can generate, or otherwise process, a wideband signal in order to recover the narrowband message. Synchronization is often the most difficult and costly aspect of a spread spectrum communications system.

In order to simplify the receiver in a spread spectrum communications system, it is known to transmit a reference that may be used for initial synchronization and tracking; that is, the reference is generated and transmitted with the intended information signal. Since the local reference is generated at the transmitter, the receiver need not have a code sequence or other local reference generator.

The subject invention relates to a spread spectrum communications system using a transmitted reference in order to simplify the receiver. A description of this and other types of spread spectrum communications systems may be found, for example, in *Spread Spectrum Systems*, 3rd Ed., by Robert C. Dixon, John Wiley & Sons (1994), and *Spread Spectrum Communications*, Vol. II, by M. K. Simon et al., Computer Science Press (1985).

SUMMARY OF THE INVENTION

One object of the invention is to provide a simple and inexpensive method and apparatus for effecting spread spectrum communications.

According to the invention, there are provided several methods of generating a suitable wideband carrier, a method for combining the wideband carrier with the narrowband modulated wideband carrier, and a number of implementations of a simple, inexpensive receiver for the transmitted reference system.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF A PREFERRED EMBODIMENT OF THE INVENTION

Figure 1:
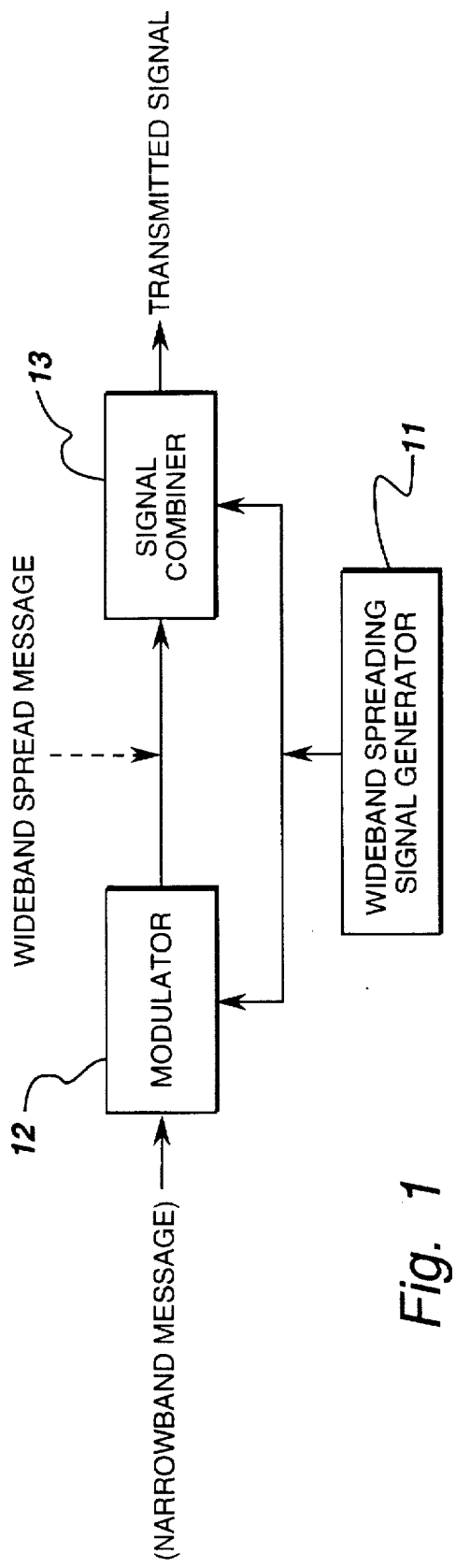
FIG. 1 is a high level block diagram showing the generalized concept of a transmitted reference spread spectrum communications system.

FIG. 1, is a generalized block diagram of a transmitted reference spread spectrum communication system. A wideband spreading signal from a generator 11 is supplied to a balanced modulator 12 whose other input signal is the narrowband message signal. The output signal of balanced modulator 12, i.e., a wideband spread message signal, is combined with the wideband spreading signal from generator 11 in a signal combiner 13 to generate the transmitted signal.

To demodulate such signal without using a transmitted reference, one could generate the wideband spreading signal, synchronize it to the transmitter's wideband spreading signal (appropriately delayed to account for propagation delay), mix the received wideband signal, and filter the narrowband message signal from the mixed signal. Such approach may require complex synchronization circuitry and algorithms.

If, however, the wideband spreading signal is also transmitted, the receiver may simply use it to perform the mixing and not be concerned with its generation. One aspect of the invention therefore, is to provide ways in which such spreading signal might best be transmitted along with the wideband modulated signal. More particularly, the invention provides a number of methods of generating a suitable wideband carrier, a method of combining the wideband carrier with the narrowband-modulated wideband carrier, and a number of implementations of a simple, inexpensive receiver for the transmitted reference spread spectrum communications system.

The wideband carrier may be generated in any of a number of ways. These include the following:

- a maximal length shift register and balanced modulator combining with a tone,
- the use of Geometric Harmonic Modulation (GHM) wherein the wideband carrier is simply the product of a harmonically related set of tones, the use of a truly random (i.e., non-deterministic) wideband noise source, and the use of specially constructed sequences to provide optimal autocorrelation properties for the receiver function.

Where the wideband carrier is generated by a signal extracted from a deterministic finite state sequential machine, a random-like succession of states is obtained at the feedback terminal of a maximal length feedback shift register or an "m-sequence" generator. Geometric Harmonic Modulation (GHM) is described by J. Hershey, G. Saulnier, A. Hassan and S. Hladik in "Geometric Harmonic Modulation—A New Spread Spectrum Genre", *International Conference on Communications*, 1995. A solid state device, such as a diode, can be operated in such a manner as to generate a wideband and non-deterministic signal as when the diode is operated in a "back-biased" condition. Also, the wideband carrier may be generated by a wideband frequency "chirp" generator. All these techniques are well known and understood in the art; therefore, a detailed description will be omitted.

The wideband carrier may be modulated by use of a balanced mixer which may or may not be quadrature capable. Modulation of the narrowband information signal may involve zero frequency spectrum suppression and possess other attributes through employment of Manchester or Mueller waveform coding. If the narrowband information signal is digital, forward error correction coding (ECC) may also be applied.

Figure 2:
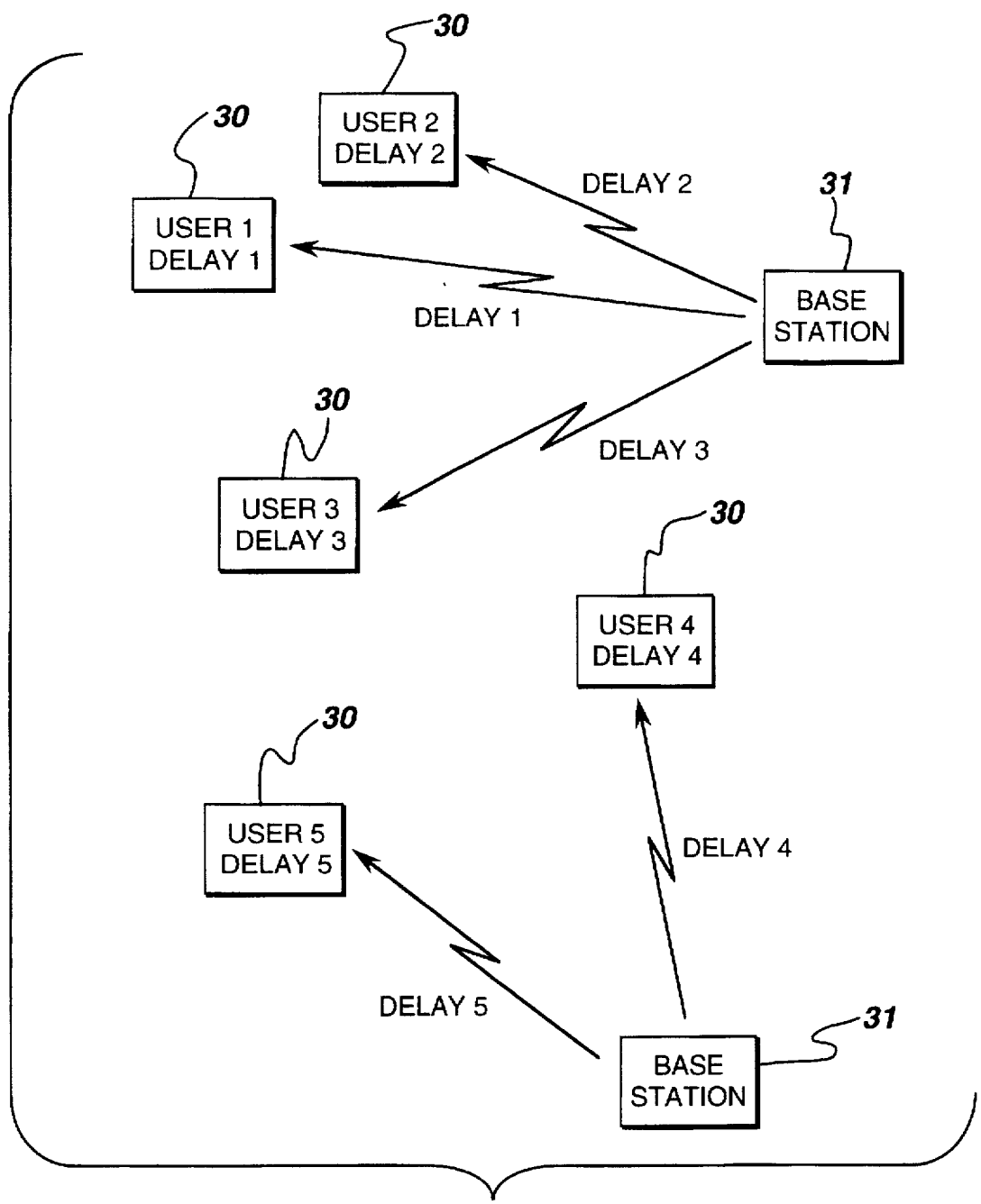
FIG. 2 is a block diagram showing an example of two base stations and a plurality of users, implementing a strategy allowing multiple users to share a common channel.

Propagation considerations may require the base facility to broadcast from a plurality of antennas placed about the base facility. As indicated in FIG. 2, the base facility may be comprised of one or more base stations 31 communicating with multiple users 30. In order to achieve nearly 100% coverage, it is inevitable that the different transmissions will overlap at some receivers. It is therefore a preferred embodiment of the invention to combine a particular wideband carrier with the modulated wideband carrier by adding the particular wideband carrier to the modulated wideband carrier after a delay exceeding the main autocorrelation lobe of the modulated wideband carrier. Different transmissions may be overlaid by requiring them to have delays which are sufficiently different from one another. This strategy allows multiple users 30 to share the channel and defines a new multiple-access technique.

Figure 3:
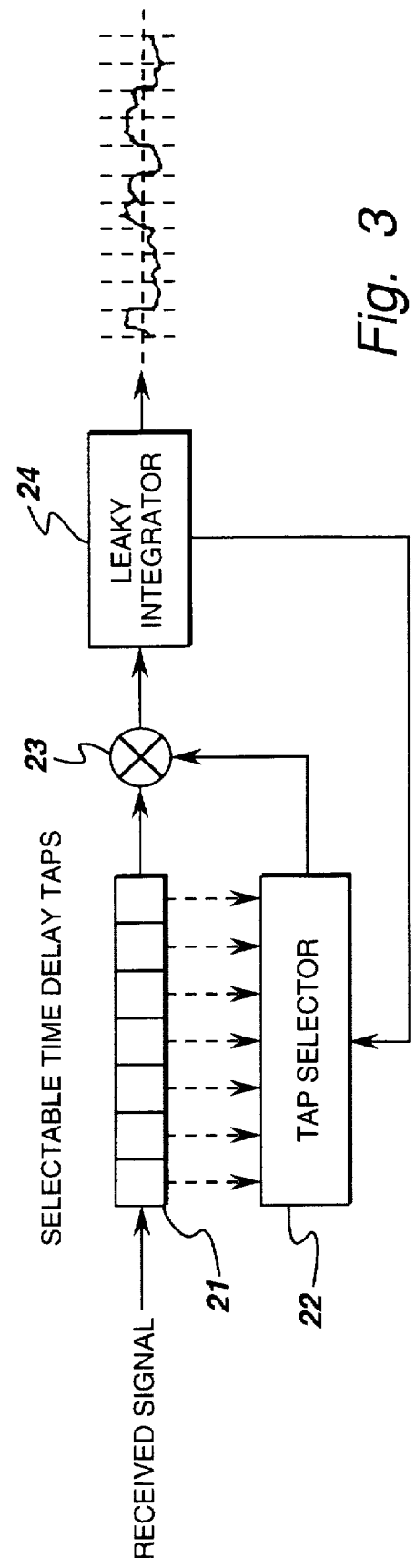
FIG. 3 is a block diagram illustrating the transmitted reference demodulation principle according to the invention.

Demodulation at the receiver is extremely simple, as illustrated in FIG. 3. The detected received signal is provided to a selectable time delay device 21 having a plurality of taps. The signal from time delay device 21 is supplied to one input of a mixer 23. The other input to mixer 23 is provided through a tap selector 22 that selects a delayed output of the input signal. The output of mixer 23 is coupled to a baseband leaky integrator 24 which provides a measure of demodulated signal strength to tap selector 22. It should be noted that the wideband carrier used at one delay need not be the same carrier, or even carrier process, used at another delay. Essentially, any correlated signal at a particular delay will have half of its power sent to the baseband leaky integrator 24. Baseband filtering may be applied after detection to reduce interference.

Selectable time delay device 21 may be implemented in any of a number of ways such as by:

a surface acoustic wave (SAW) device, a transmission line constructed out of discrete "lumped parameter" analog elements, or a transmission line constructed out of suitable tapped or untapped coaxial cable segments.

Since the message signal and the reference signal undergo nearly identical Doppler shifts, there is no Doppler tracking problem.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A transmitted reference spread spectrum communications system comprising:

a transmitter including means for modulating a wideband carrier signal with a narrowband message signal to generate a wideband spread message signal, and means for combining the wideband carrier signal with the wideband spread message signal to generate a transmitted reference spread spectrum signal after delaying said wideband spread message signal by a delay exceeding a non-zero autocorrelation width of the wideband carrier signal and less than the interval between consecutive autocorrelation peaks minus the non-zero autocorrelation width of the wideband carrier signal; and a receiver including a selectable time delay device for receiving a detected signal from said transmitter, a selector for selecting a delayed signal from said selectable time delay device, a mixer for combining output signals of the selectable time delay device and the selector, and a leaky integrator responsive to output signals from said mixer and for controlling said selector, whereby said leaky integrator is enabled to generate the narrowband message signal.

2. The transmitted reference spread spectrum communications system of claim 1 wherein the transmitter further includes a wideband carrier generator for generating said wideband carrier signal.

3. The transmitted reference spread spectrum communications system of claim 2 wherein the wideband carrier generator comprises a geometric harmonic modulator.

4. The transmitted reference spread spectrum communications system of claim 2 wherein the wideband carrier generator comprises a solid state device operated to generate a wideband and non-deterministic signal.

5. The transmitted reference spread spectrum communications system of claim 2 wherein the wideband carrier generator comprises a deterministic finite state sequential machine whose succession of states is random-like.

6. The transmitted reference spread spectrum communications system of claim 2 wherein the wideband carrier generator comprises a wideband frequency chirp generator.

7. The transmitted reference spread spectrum communications system of claim 1 wherein said selectable time delay device comprises a surface wave acoustic device.

8. The transmitted reference spread spectrum communications system of claim 1 wherein said selectable time delay device comprises a transmission line.

9. A method of implementing transmitted reference spread spectrum communications comprising the steps of:

modulating a wideband carrier signal with a narrowband message signal to generate a wideband spread message signal;

combining the wideband carrier signal with the wideband spread message signal to generate a transmitted reference spread spectrum signal after delaying said wideband spread message signal by a delay exceeding a non-zero autocorrelation width of the wide band carrier signal and less than the interval between consecutive autocorrelation peaks minus the non-zero autocorrelation width of the wideband carrier signal;

transmitting the transmitted reference spread spectrum signal;

receiving at a receiver location the transmitted reference spread spectrum signal;

delaying the received transmitted reference spread spectrum signal by a selectable amount of time;

combining the received transmitted reference spread spectrum signal and the delayed received transmitted reference spread spectrum signal;

integrating the combined received transmitted reference spread spectrum signal with a leaky integrator to generate the narrowband message signal; and controlling the selected amount of time delay applied to the received transmitted reference spread spectrum signal as a function of signal strength in said leaky integrator.

10. A transmitted reference spread spectrum multiple access communication system comprising:

a plurality of transmitters, each of said transmitters including means for modulating a wideband carrier signal with a narrowband message signal to generate wideband spread message signal and means for combining the wideband carrier signal with the wideband spread message signal to generate a transmitted reference spread spectrum signal after delaying said wideband spread message signal by a delay exceeding a non-zero autocorrelation width of the wide band carrier signal and less than the interval between consecutive autocorrelation peaks minus said non-zero autocorrelation width of the wideband carrier signal, each of said transmitters, when active, utilizing a different delay, respectively; and a plurality of receivers, each of said receivers including a selectable time delay device for receiving a signal from one of said transmitters, a selector for selecting a delayed signal from said selectable time delay device, a mixer for combining output signals of the selectable time delay device and the selector, and a leaky integrator responsive to output signals from said mixer and for controlling said selector, whereby said leaky integrator is enabled to generate the narrowband message signal.

11. The transmitted reference communication system of claim 10 wherein the delay utilized by each of said transmitters that is active is selected at random from a time interval bounded by a non-zero autocorrelation width of the wideband carrier signal and the interval between consecutive autocorrelation peaks minus said non-zero autocorrelation width of the wideband carrier signal.

\* \* \* \* \*